Patented Oct. 21, 1930

1,779,334

UNITED STATES PATENT OFFICE

BENJAMIN F. REEVES, OF GUTHRIE CENTER, IOWA

CULTIVATOR SHIELD

Application filed October 26, 1928. Serial No. 315,249.

This invention relates to a shield for cultivators and the like, the general object of the invention being to provide a shield having a pointed front end which will act to deflect the leaves and other portions of plants away from the plows while acting in the usual manner to prevent the dirt thrown up by the plows from covering the plants.

Another object of the invention is to provide adjustable means for connecting the shield with the beam of the cultivator so that the shield can be placed in various positions according to the work being done.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
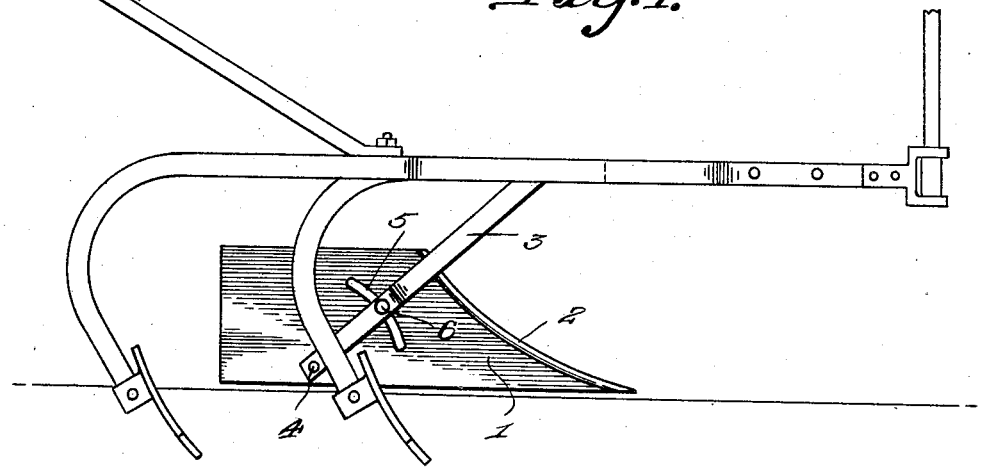
Figure 1 is a side view of the cultivator, showing the invention in use.
Figure 2:
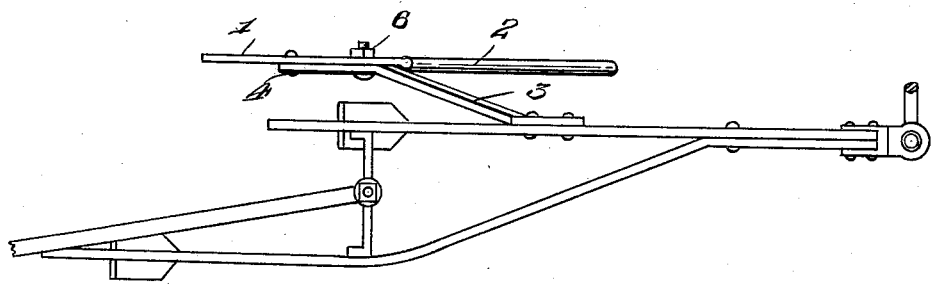
Figure 2 is a plan view of Figure 1.

In these views, the numeral 1 indicates the improved shield which is formed of a flat plate of substantially rectangular shape with its front end sloping from the top edge downwardly and outwardly to the under edge so that the front edge is pointed. This front edge is also thickened, as shown at 2, by rounding the metal at this point to form a bead. The shield is attached to the beam of the cultivator by a diagonally arranged bar 3 which has its ends offset from its center so that the shield is located at one side of the beam, as clearly shown in Figure 2. The lower part of the shield is pivotally connected to the lower end of this bar 3, as shown at 4, and the shield is formed with an arcuate slot 5 through which passes a bolt 6 which also passes through the bar 3 so that by loosening the nut on this bolt, the shield can be adjusted to any one of various positions in order to position the shield in accordance with the work being done by the cultivator.

As will be seen, the shield will act in the usual manner to prevent the dirt thrown up by the plows from covering the plants and its pointed end will act to force leaves or other portions of the plants away from the plows and thus prevent these portions of the plants being injured by the parts of the cultivator.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a cultivator, a bar having straight ends and a diagonal central part, one end of the bar being immovably connected with the beam of the cultivator, a shield forming plate pivotally connected with the other end of the bar, said plate having an arcuate shaped slot therein, a bolt passing through the bar and said slot for adjustably connecting the plate with the bar, the front end of the plate curving forwardly and downwardly to form a point, the said curved front end being thickened at its edge to form a bead.

In testimony whereof I affix my signature.

BENJAMIN F. REEVES.